July 7, 1959 R. M. LOGAN 2,893,142
PORTABLE SELF CLOSING ELECTRIC GATE
Filed Feb. 1, 1957 2 Sheets-Sheet 1
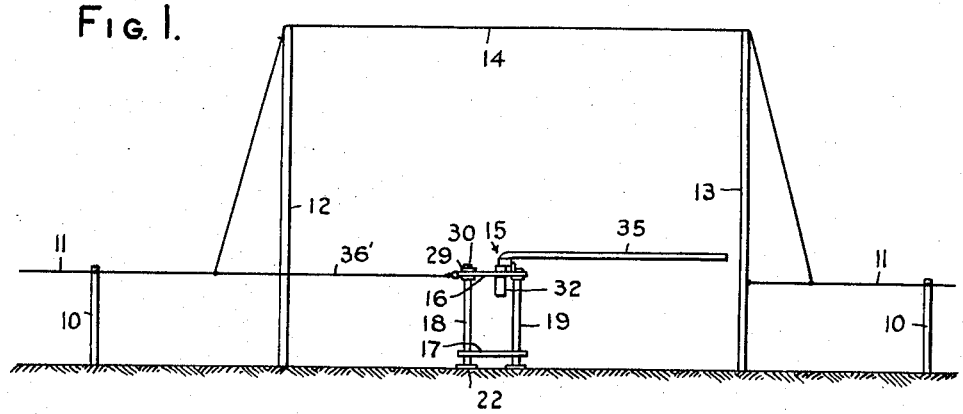
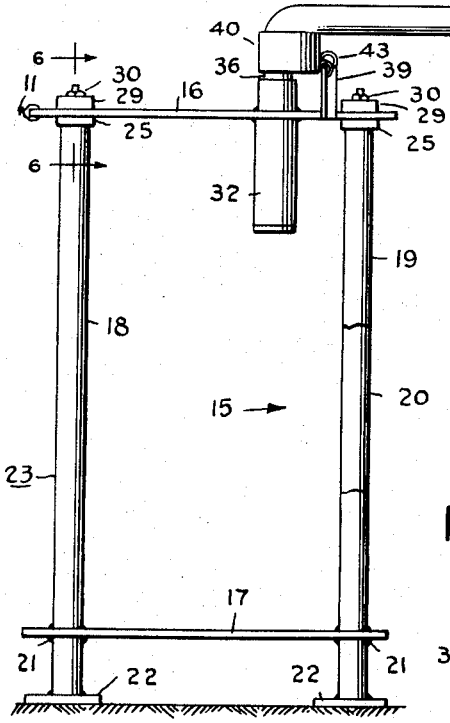
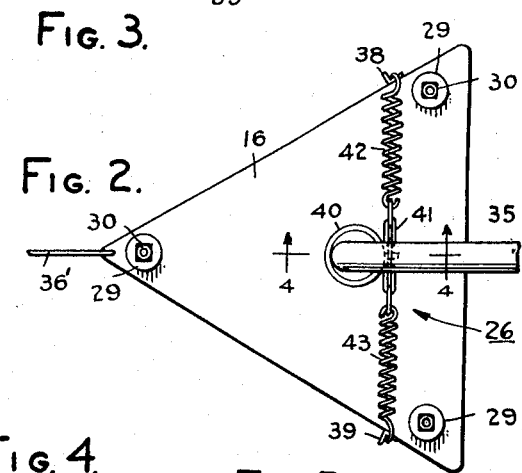
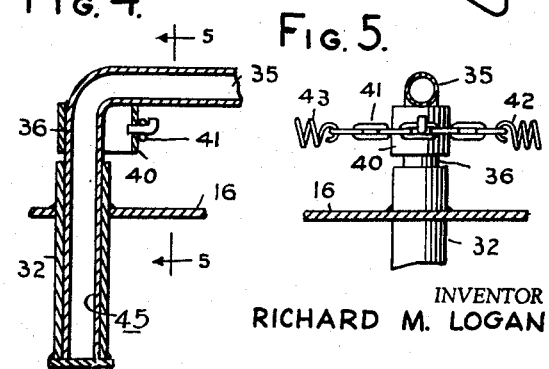
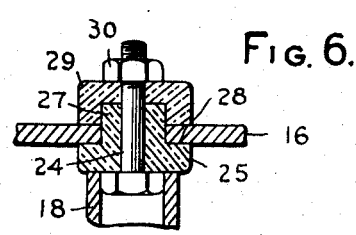
INVENTOR
RICHARD M. LOGAN
BY Woodling + Krost
ATTORNEYS July 7, 1959 R. M. LOGAN 2,893,142
PORTABLE SELF CLOSING ELECTRIC GATE
Filed Feb. 1, 1957 2 Sheets-Sheet 2

INVENTOR.
RICHARD M. LOGAN
BY Woodling & Krost
ATTORNEYS

United States Patent Office 2,893,142
Patented July 7, 1959

2,893,142

PORTABLE SELF CLOSING ELECTRIC GATE

Richard M. Logan, Mount Gilead, Ohio

Application February 1, 1957, Serial No. 637,731

11 Claims. (Cl. 39—92)

This invention relates to electrically conductive gates for disposition in gaps in electrically charged fences which are movable from place to place and are self closing when in operation.

This application is a continuation-in-part of my application Serial No. 381,633, filed September 22, 1953, entitled, "Portable Self Closing Electric Gate."

It is among the objects of the invention to provide an improved electric gate of portable construction which can be easily moved from place to place and installed in a gap in an electric fence; which can be electrically connected to the associated fence by a single electrical conductor; which permits the passage of vehicles, such as trucks and tractors, therethrough and will automatically close after the passage of such a vehicle, but will restrain live stock by reason of the electrical charge which it carries; and which can be economically manufactured from readily available stock material. The gate may also be used in place of a regular gate with a permanent fence or to close an opening in any structure.

Another object of the invention is to provide an electric gate having a support structure and a gate bar with a new and novel means of pivotally connecting the gate bar to the support structure.

Another object of the invention is to provide an electric gate having a support structure and a gate bar carried thereby and electrically insulated therefrom.

Another object of the invention is to provide an electric gate having a support structure and a gate bar with novel spring means for urging the gate bar to a predetermined position relative to said support structure.

Another object of the invention is to provide an electric gate with a base having wall means readily adapted to receive counterweights to maintain the electric gate structure in an upright position.

Other objects and advantages will become apparent from a consideration of the following description and the appended claims in conjunction with the accompanying drawings wherein:

Figure 1 is a diagrammatic elevational view showing an electric fence provided with a gap and bridging means for carrying electric current across the gap and with a portable electric gate disposed in the gap;

Figure 2 is a fragmentary plan view of the electric gate;

Figure 3 is a side elevational view of the electric gate;

Figure 4 is an enlarged fragmentary cross sectional view on the line 4—4 of Figure 2;

Figure 5 is a fragmentary cross sectional view on the line 5—5 of Figure 4;

Figure 6 is an enlarged fragmentary cross sectional view on an enlarged scale on the line 6—6 of Figure 3;

Figure 7:
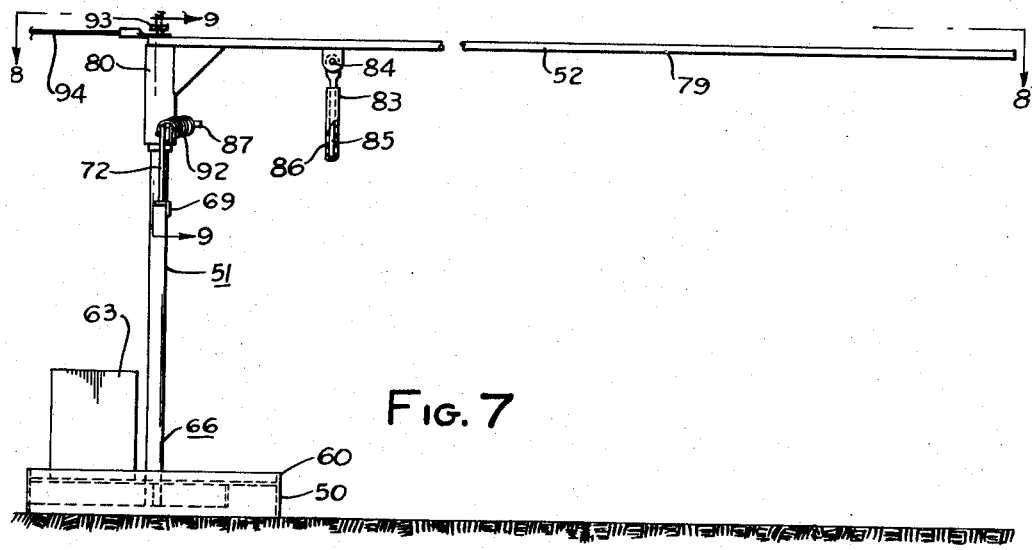
Figure 7 is an elevational view showing another form of an electric fence made in accordance with the teachings of the present invention.

With continued reference to the drawings, the electric fence, as illustrated in Figure 1, comprises fence posts 10 disposed in upright position at spaced apart intervals along the fence line and each carrying near its upper end an electrical insulator. A fence wire 11 is supported by the posts 10 being connected to the insulators carried by the posts and is disposed above and substantially parallel to the ground. This wire is charged with electricity from a suitable charging apparatus well known to the art. A gap is provided in the fence and at each side of the gap the posts are vertically elongated, as indicated at 12 and 13, so that their upper ends are disposed a distance above the ground greater than the height of persons, live stock or vehicles which may pass through the gap. A wire 14 extends across the space between the posts 12 and 13 and over their upper ends, and is brought down at the outer sides of the post 12 and connected to the fence wire 11 and brought down at the outer side of the post 13 and connected to the fence wire at the corresponding side of the gap to transmit the electrical charge of the fence across the gap.

In accordance with the present invention, the gap is closed by a portable, electric gate, generally indicated at 15 and comprising a stand or support structure 23. Two horizontal plates 16 and 17 of triangular shape are disposed in vertically spaced and substantially parallel relationship with respect to each other, each plate being provided with an aperture adjacent each corner thereof. The plate 16 includes part of an upper portion of the support structure. The stand further comprises tubular standards 18, 19 and 20 disposed in spaced apart and parallel relationship to each other and extending through corresponding ones of the apertures in the plates 16 and 17. The plate 17 is spaced from the bottom ends of the standards 18, 19 and 20 and the standards extend one through each of the apertures near the corners of this triangular plate and are welded to the plate, as indicated at 21. Disc members of circular shape, as indicated at 22, are secured on the lower ends of the standards 18, 19 and 20 one on each standard, to provide foot formations adapted to rest on the ground and support the stand in upright position, as illustrated in Figures 1 and 2.

At their upper ends the standards are provided with longitudinal extensions, as indicated at 24, of reduced diameter and solid construction which extends through the corresponding apertures in the top plate 16. As illustrated in Figure 6, a washer 25 of electrically insulative material has a centrally disposed bore receiving the extension 24 and this washer rests on the top of the standard 18 and has a coaxial boss 27 of reduced diameter extending through and closely received in the corresponding aperture in the top plate 16.

The washer 25 is provided with an external, annular shoulder 28 on which the bottom surface of the plate 16 rests. A cap 29, also of electrically insulative material, fits over the upper end of the boss 27 above the plate 16 and bears on the top surface of the plate around the boss 27. The cap 29 is provided with an aperture through which the standard extension 24 projects and a nut 30 is threaded on the extension and bears on the cap 29 and secures the plate 16 between the washer 25 and the cap to firmly secure the upper end of the standard to the top plate or top structure 16. All of the standards 18, 19 and 20 are similarly secured to the top plate 16 and are electrically insulated from this top plate. This insulation may be referred to as insulation means and insulates the gate bar 35 from the support structure 23.

The top plate 16 is provided with a fourth aperture located near the center of the plate and a vertical bearing socket or member 32 depends through this fourth aperture and is disposed perpendicular to the plate 16. The bearing member 32 is secured to the plate 16, as by a welding. A horizontal gate bar 35 in the form of an elongated tube of electrically conductive material has at one end a perpendicularly depending portion 36 with wall means 45 rotatably received in the socket 32 so that the bar 35 is supported above the stand for swinging movement about the axis of the socket 32.

The stand or support structure has a height substantially the same as the height of the fence posts 10 or as the distance between the fence wire 11 and the ground so that the gate bar 35 is supported at substantially the same elevation as the fence wire 11. The top plate 16 of the stand is formed of electrically conductive material and an extension 36' of the fence wire 11 is connected to the plate 16, and, through the pivotal connection between the socket 32 and the bar 35, so that the bar will be electrically charged whenever the fence wire 11 is charged. The standards 18, 19 and 20 and the bottom plate 17 being insulated from the top plate 16, will not, however, be electrically charged at any time and this arrangement greatly facilitates shifting of the gate, when desired, within the limits of the extension 36 without disconnecting this extension from the gate.

Spaced angle brackets or tabs 38 and 39 project upwardly from the divergent edges of the plate 16 near the transverse edge of the plate beyond which the bar 35 extends. The portion of the plate 16 which extends between the brackets 38 and 39 and which is indicated generally by the reference numeral 26 may be referred to generally as a transverse member or a crossarm. A cylindrical collar 40 of greater diameter than the surrounding and depending end portion 36 of the bar 35 above the upper end of the bearing socket 32 and is secured at one point to the portion 36. A short chain 41 has its center link attached to the collar 40 at a point opposite to that at which the collar is secured to the bar portion 36, and contractile springs 42 and 43 are connected to and stretched between the brackets 38 and 39 and related ends of the chain 41, whereby the bar 35 is yieldably urged to a predetermined centered position midway between the standards 19 and 20 and in line with the fence post 13, as illustrated in Figures 1 and 2, and terminating at its free end short of the post 13.

Figure 8:
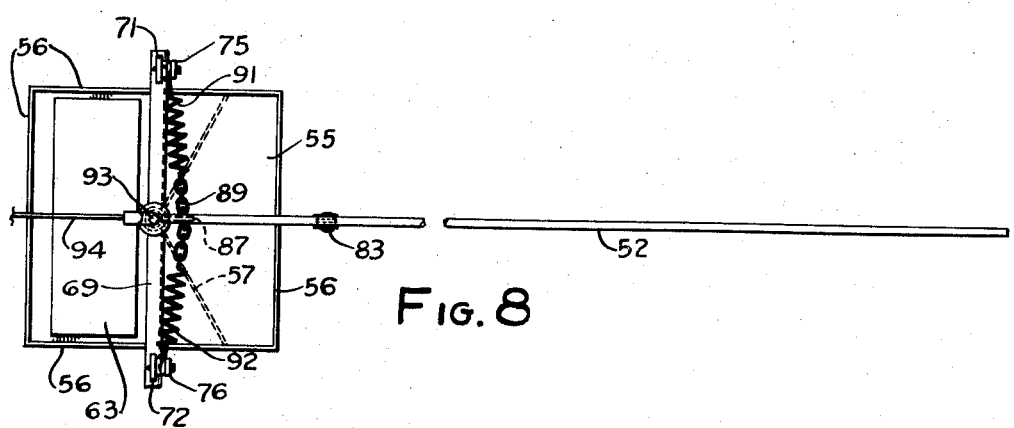
Figure 8 is a plan view taken along the lines 8—8 of Figure 7.
Figure 9:
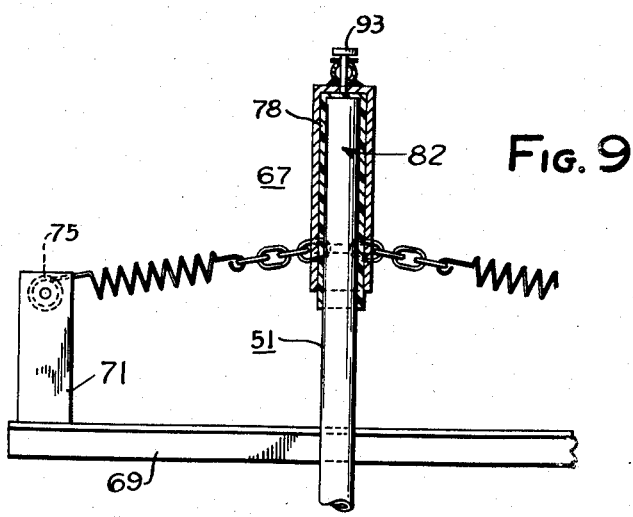
Figure 9 is a fragmentary view partially in section taken generally along the line 9—9 of Figure 7.

The form of the electric gate illustrated in Figures 7, 8 and 9 includes generally a base 50, a post or support structure 51, and a gate bar 52. The base member 50 comprises a generally square configuration as viewed in Figure 8 and has a bottomwall 55 and four generally vertically extending side walls 56. These walls are secured together by any suitable means such as by welding and supporting ribs 57 are provided to give good stability to the base member. The portion of the side walls 56 which extend above the bottom wall 55 may be referred to as a peripheral flange indicated by the reference numeral 60 (Figure 7) and this flange 60 is adapted to retain sufficient counterweight on the bottom wall 55 (the counterweight in the drawings being indicated by the cement block 63) to maintain the electric gate in an upright position as shown in the drawings.

The post or support structure 51 has first and second end portions 66 and 67, respectively, with the first end portion 66 being fixedly secured to the base 50 by any suitable means with the post extending substantially vertically therefrom. A crossarm or transverse member 69 is fixedly secured to the post 51 between the first and second end portions thereof. This crossarm extends to either side of the post and generally normal to the extent thereof. First and second tabs 71 and 72, respectively, are fixedly secured to the respective end portions of the crossarm 69. These tabs as shown in Figures 7, 8 and 9 extend generally vertically from the crossarm and are provided with insulators 75 and 76, respectively, thereon. The second end portion 67 of the post 51 is covered with a layer of insulating material 78 which may be, for the sake of example, a piece of plastic pipe. The second end portion 67 in combination with the insulating material therearound may be said to constitute a bearing member. The gate bar 52 includes a horizontal portion 79 and a vertical portion 80. The vertical portion 80 includes wall means which define a socket 82 which fits over the second end portion 78 and adapts the vertical portion 80 for pivotal movement about the bearing member 67. To facilitate manual opening of the gate a handle 83 is pivotally attached at 84 to the horizontal portion 79 of the gate bar 52. This handle includes a metal interior portion 85 covered by a plastic insulating material 86. To facilitate automatic closing of the gate after it has been opened, a centering member 87 is provided and is secured to and extends from the outer portion of the socket 82 generally in the same direction as the gate bar 52. First and second chain links 89 and 90, respectively, are secured to the centering member 87. A first spring 91 is secured to and extends between the first insulator 75 and the first chain link 89. A second spring 92 is secured to and extends between the second insulator 76 and the second chain link 90. These springs therefore at all times bias the gate bar 52 to the position shown in Figure 8. When opened the bar will return to this position. To provide electrical connection to the gate bar 52 a pin 93 is secured to the gate bar at the juncture between the horizontal and vertical portions 79 and 80 and this pin is adapted to be connected to a conductor 94 which is an extension from the main electric fence. The gate bar 52 is as a result electrically charged and will prevent farm animals from traveling through. Because of the insulating material 78 and the insulators 75 and 76, the post or support structure 51 is electrically insulated and may be handled without disconnecting the gate from an associated electric fence.

In the arrangement illustrated in Figure 1 the fence wire extension 36 closes the portion of the gap in the fence between the gate stand and the post 12 and the gate bar 35 closes the portion of the gap between the gate stand and the post 13. As long as the fence wire 11 and the gate bar 35 are electrically charged, live stock will not pass through the gate or press against the gate bar.

A vehicle, such as a truck or agricultural tractor, may, however, press against the gate bar of the gates illustrated and force the gates open for the passage of a vehicle therethrough without electrical shock to the driver of the vehicle. When the vehicle has passed through the gap the gate bar will be swung back to its centered position, as described above, closing the gap. When it is desired to open the entire gap, for the passage of live stock therethrough, the entire gate may be manually lifted and moved to a position at one side of the gap so that there will be no obstruction in the gap and this may be done without disconnecting the gate from the fence. The gate of Figure 7 may also be opened manually by use of the handle 83.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An electric gate for disposition in a gap in an electric fence, comprising, a portable stand adapted to rest in upright position on the ground and having a top structure electrically insulated from the remainder of the stand and adapted to be electrically connected to an associated electric fence, a gate bar pivotally mounted at one end on said top structure and extending outwardly from the upper end of said stand in substantially horizontal position, and spring means connected between said bar and said top structure resiliently urging said bar to a predetermined position relative to said top structure, said top structure comprising a metal plate having a bearing sleeve secured in perpendicular position thereto and said bar comprising an elongated metal tube having at one end a perpendicularly offset portion rotatably carried by said bearing sleeve.

2. A portable electric gate for disposition in a gap in an electric fence, comprising, a portable, upright stand including a plurality of spaced standards adapted at one end to rest upon the ground, electrical insulators on the upper ends of the respective standards, a substantially horizontal, electrically conductive plate supported by the respective insulators out of contact with the standards and adapted for connection to an electrically conductive fence wire, and an electrically conductive, upwardly open bearing socket on and electrically connected to said plate; and a substantially horizontal, electrically conductive gate bar having at one end a depending portion rotatably engaged in and electrically contacting said socket.

3. A portable electric gate for disposition in a gap in an electric fence, comprising, a portable, upright stand including a plurality of spaced standards adapted at one end to rest upon the ground, upwardly projecting, longitudinal extensions on the other ends of the standards of reduced diameter relative to the diameters of the standards, first electrically insulative washers having centrally disposed bores receiving the extensions, said first washers being supported upon the upper ends of the standards and being formed with axial bosses of reduced diameter, and second electrically insulative washers receiving the reduced bosses of the first washers and having center openings through which the longitudinal extensions of the standards project, a substantially horizontal, electrically conductive plate having openings receiving the bosses of the first washers, the second washers bearing against the top surface of the plate so as to clamp the plate between the first and second washers out of electrical contact with the standards, said plate being adapted for connection to an electrically conductive fence wire, and an electrically conductive, upwardly opening bearing socket electrically engaged with and supported by said plate; and a substantially horizontal, electrically conductive gate bar formed at one end with a depending portion rotatably engaged in and electrically engaged with said socket.

4. In an electric fence gate, a stand, comprising, standard means having an upper end, a horizontal conductive plate fixedly mounted on said upper end and insulated from said standard means, a vertical conductive socket on and electrically engaged with said plate, a conductive horizontal gate bar having a free end and another end, a depending portion on said other end of the gate bar journalled in and in electrical contact with said plate, said plate having side edges and an end edge beyond which said gate bar extends, brackets on said side edges, contractile springs connected to and stretched between said brackets and said gate bar and yieldably centering said gate bar between said side edges of the plate.

5. In an electric fence gate, a stand, comprising, standard means having an upper end, a horizontal conductive plate fixedly mounted on said upper end and insulated from said standard means, a vertical conductive socket on and electrically engaged with said plate, a conductive horizontal gate bar having a free end and another end, a depending portion on said other end of the gate bar journalled in and in electrical contact with said plate, said plate having side edges and an end edge beyond which said gate bar extends, brackets on said side edges, contractile springs connected to and stretched between said brackets and said gate bar and yieldably centering said gate bar between said side edges of the plate, and means connecting said springs to the gate bar comprising a collar surrounding said depending portion of the gate bar, said collar being fixed to said depending portion at a point on one side of the collar, said springs being connected to the collar at a point on the opposite side of the collar.

6. An electric gate for disposition in a gap in an electric fence, comprising, a portable stand adapted to rest in upright position on the ground and having a top structure electrically insulated from the remainder of the stand and adapted to be electrically connected to an associated electric fence, a gate bar pivotally mounted at one end on said top structure and extending outwardly from the upper end of said stand in substantially horizontal position, and spring means connected between said bar and said top structure resiliently urging said bar to a predetermined position relative to said top structure, said top structure comprising a metal plate having a bearing member secured in perpendicular position thereto and said bar comprising an elongated metal member having at one end a perpendicularly offset portion rotatably carried by said bearing member.

7. An electric gate including in combination a base comprising a generally horizontal member spaced from the ground and a plurality of vertical members secured intermediate their upper and lower end portions to the periphery of said horizontal member, said lower end portion of said vertical members adapted to rest only on the upper portion of the ground to render said gate portable and unattached to the ground, said upper end portion of said vertical members forming a flange on said base to retain counterweights placed on said base which counterweights are adapted to maintain said gate in an upright position, a post member having first and second end portions, said first end portion of said post member being fixedly secured to said base with said post extending substantially vertically therefrom, a crossarm having first and second end portions and fixedly secured to said post member between said first and second end portions thereof and extending to either side thereof and generally normal to the extent of said post member, first and second electrical insulators carried by said first and second end portions of said crossarm respectively, said second end portion of said post member having insulating material therearound, a movable gate member having a horizontal portion integral with a vertical portion, said vertical portion including a socket fitting over said second end portion of said post member and adapted for pivotal movement thereabout on said insulating material whereby said gate member is insulated from said post member, means including a pin secured to said gate member substantially coaxial with said post member for attaching an electrical conductor to said movable gate member, a centering member secured to said socket, first and second links secured to said centering member, a first spring extending between said first insulator and said first link, a second spring extending between said second insulator and said second link, a handle, pivot means pivotally attaching said handle to said horizontal portion of said gate member, and insulating material around said handle.

8. An electric gate including in combination a base comprising a generally horizontal member spaced from the ground and a plurality of vertical members secured intermediate their upper and lower end portions to the periphery of said horizontal member, said lower end portion of said vertical member adapted to rest on the upper portion of the ground to render said gate portable and unattached to the ground, said upper end portion of said vertical members forming a flange on said base to retain counterweights placed on said base which counterweights are adapted to maintain said gate in an upright position, a post member having first and second end portions, said first end portion of said post member being mounted by said base with said post extending substantially vertically therefrom, a crossarm having first and second end portions secured to said post member between said first and second end portions thereof and extending to either side thereof and generally normal to the extent of said post member, said second end portion of said post member having insulating material therearound, a gate member having a horizontal portion and a vertical portion, said vertical portion including a socket fitting over said second end portion of said post member and adapted for pivotal movement thereabout on said insulating material whereby said gate member is insulated from said post member, first insulated spring means extending between said gate member and said first end portion of said crossarm, second insulated spring means extending between said gate member and said second end portion of said crossarm, and means for securing an electrical conductor to said movable gate member.

9. A portable electric gate for disposition in a gap in an electric fence including in combination a support structure having an upper and lower portion, said lower portion of said support structure adapted to engage the surface of the ground only, to support said structure in an upright position, a gate bar carried by said upper portion of said support structure and extending outwardly from said upper portion thereof in substantially horizontal position, first and second spaced portions on said upper portion of said support structure, spring means extending between said first spaced portion and said gate bar and between said second spaced portion and said gate bar for urging said gate bar toward a predetermined position, said upper portion of said support structure including a bearing member substantially vertically disposed and said gate bar having at one end portion an offset portion, said offset portion having wall means cooperating with said bearing member to pivotally mount said gate bar, insulation means insulating said gate bar from said lower portion of said support structure and means electrically connecting said gate bar to an associated electric fence.

10. An electric gate comprising a base member having a flange therearound to retain counterweights placed on said base, a post member having first and second end portions, said first end portion of said post member being fixedly secured to said base with said post extending substantially vertically therefrom, a crossarm having first and second end portions and fixedly secured to said post member between said first and second end portions thereof and extending to either side thereof and generally normal to the extent of said post member, first and second tabs fixedly secured to said first and second end portions respectively of said crossarm, first and second electrical insulators carried by said first and second tabs respectively, said second end portion of said post member having insulating material therearound, a gate member having a horizontal portion and a vertical portion, said vertical portion including a socket fitting over said second end portion of said post member and adapted for pivotal movement thereabout, a centering member secured to and extending from said socket, first and second chain links secured to said centering member, a first spring extending between said first insulator and said first chain link, a second spring extending between said second insulator and said second chain link, and an insulated handle extending from said horizontal portion of said gate member.

11. A gate comprising a base adapted to rest on the surface of the ground, a post member having first and second end portions, said first end portion of said post member being secured to said base with said post extending upwardly therefrom, a crossarm having first and second end portions and secured to said post member between said first and second end portions thereof, first and second insulators carried by said crossarm, said second end portion of said post member having insulating material therearound, a gate member having a horizontal portion and a vertical portion, said vertical portion including a socket fitting over said second end portion of said post member and adapted for pivotal movement thereabout, a centering member secured to and extending from said socket, a first spring extending between said first insulator and said centering member, a second spring extending between said second insulator and said centering member, and said first and second springs biasing said gate member to a predetermined position relative to said post member.

References Cited in the file of this patent
UNITED STATES PATENTS

| | | |
|---|---|---|
| 1,297,949 | Werezak | Mar. 18, 1919 |
| 2,409,076 | Steinberger et al. | Oct. 8, 1946 |
| 2,540,562 | Wood | Feb. 6, 1951 |
| 2,731,744 | Schnell | Jan. 24, 1956 |